No. 759,136. Patented May 3, 1904.

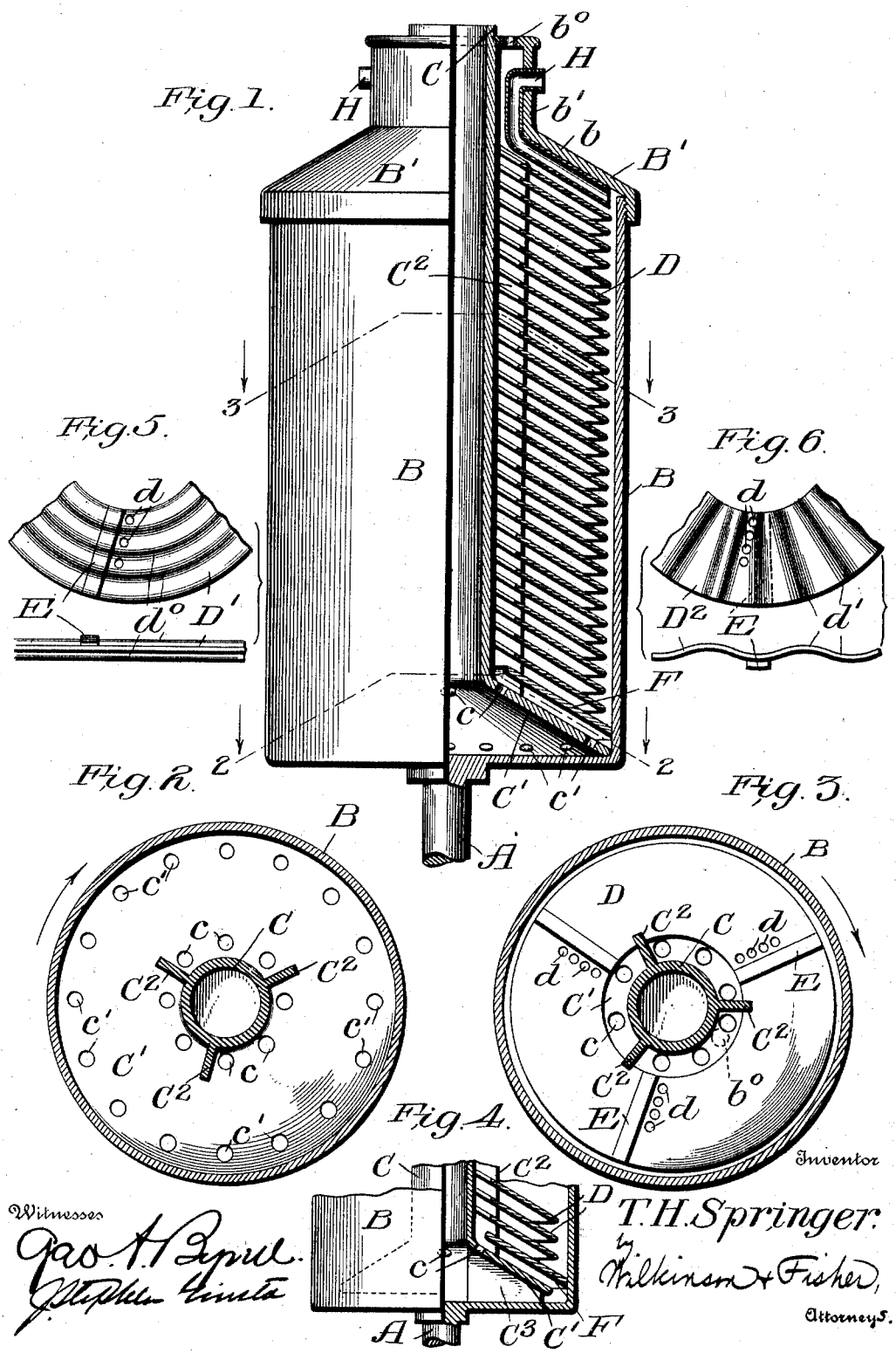

UNITED STATES PATENT OFFICE.

THOMAS H. SPRINGER, OF PHILADELPHIA, PENNSYLVANIA.

CENTRIFUGAL LIQUID-SEPARATOR.

SPECIFICATION forming part of Letters Patent No. 759,136, dated May 3, 1904.

Application filed June 6, 1903. Serial No. 160,380. (No model.)

*To all whom it may concern:*

Be it known that I, THOMAS HENRY SPRINGER, a citizen of the United States, residing at Philadelphia, in the county of Philadelphia and State of Pennsylvania, have invented certain new and useful Improvements in Centrifugal Liquid-Separators; and I do hereby declare the following to be a full, clear, and exact description of the invention, such as will enable others skilled in the art to which it appertains to make and use the same.

My invention relates to improvements in centrifugal liquid-separators, especially relating to cream-separators; and it consists of certain novel features that will hereinafter be described and claimed.

Reference is had to the accompanying drawings, in which the same parts are indicated by the same letters throughout the several views.

Figure 1 is a side elevation of the device, partly in section. Fig. 2 is a section along the line 2 2 of Fig. 1 looking down. Fig. 3 is a section along the line 3 3 of Fig. 1 and also looking down. Fig. 4 is a detail showing a modification of the feed-tube. Fig. 5 is a detail showing one form of corrugated disk which may be used in the invention, and Fig. 6 is a detail showing another form of corrugated disk which may also be used in the invention.

A represents the spindle, which is rotated in the usual way and which carries the bowl or casing B, which is preferably in the form of a hollow cylinder with its bottom closed. The upper end of this cylinder is covered over with a cap B', which is preferably screwed thereon, and this cap is made conical, as at $b$, then cylindrical, as at $b'$, and is perforated, as at $b^0$, so as to permit the escape of the cream.

The feed-tube C is open at the top and is flared out at the bottom in the form of a truncated cone C' and is perforated, as at $c$, near the upper portion of said truncated cone, and also, as at $c'$, near the base of said cone. This feed-tube C is provided with a plurality of ribs $C^2$, which hold the separating-disks D against turning. These disks are cut away to slip over these ribs, which also serve as spacers, and thus leave an annular space between the said disks and the feed-tube, as shown in Fig. 3. These disks are separated from each other by thin strips E. The bent pipe H opens into the top of the bowl near the exterior portion thereof and delivers the skim-milk out through the neck $b'$ of the cap B', as indicated in Fig. 1.

In the modification shown in Fig. 4 instead of holes $c'$ near the base of the cone C' a plurality of vanes $C^3$ are provided, which project down below the cone and leave an annular space beneath the lower end thereof, through which the milk is thrown by centrifugal force.

In the modification shown in Fig. 5 the disks D' are corrugated, as at $d^0$, these corrugations being annular, while in the modifications shown in Fig. 6 the corrugations $d'$ run radially.

In the various forms of device the machine rotates in the direction indicated by the arrows in Figs. 2 and 3, and behind the strips E are provided a plurality of openings $d$ in the disks D. These strips E serve as breakwaters as the machine revolves and there is slack liquid immediately in rear of them, from which the cream radially rises upward through the opening $d$. By having the disks corrugated an improved result is secured.

It will be seen that the disks D may be slipped on over the ribs $C^2$ and may be removed when desired, also that when the cap is removed all of these disks may be raised out at one operation by lifting out the feed-tube C. Of course, if it be desired, the disks may be riveted together or they may be soldered to or otherwise secured to the tube C.

The operation of the device is as follows: The whole milk is poured into the feed-tube and is thrown out radially from the cone-base, the partly-separated cream rising through the opening $c$. The milk passing through the opening $c'$, as shown in Fig. 1, or beneath the edge of the cone, as shown in Fig. 4, passes upward beneath the conical deflecting-plate F and is thrown outward again by the various disks D. The lighter cream will remain near the center, while the heavier milk will be thrown outward until finally the skim-milk will be carried off by the pipes H, while the separated cream will flow out through the opening $b^0$.

There may be a plurality of these openings $b^0$, if desired.

It will be obvious that various modifications might be made in the herein-described device which could be used without departing from the spirit of my invention.

Having thus described my invention, what I claim, and desire to secure by Letters Patent of the United States, is—

1. In a centrifugal liquid-separator, the combination with a bowl, of a central feed-tube projecting down into said bowl and provided with a perforated conical base running from said feed-tube down into the corner of said bowl, substantially as described.

2. In a centrifugal liquid-separator, the combination with a bowl, of a central feed-tube projecting down into said bowl, said feed-tube terminating in a perforated conical base extending from the bottom of said feed-tube down into the corner of said bowl, and a conical deflecting-plate located above said conical base and parallel therewith, substantially as described.

3. In a centrifugal liquid-separator, the combination with a bowl, of a central feed-tube projecting down into said bowl, and provided with a conical base which reaches from the end of said feed-tube down into the corner of said bowl, said base being provided with two rows of perforations, and a conical deflecting-plate located above said base, said deflecting-plate being fastened to said bowl, but having its inner edge separated from said feed-tube by a short space, substantially as described.

4. In a centrifugal liquid-separator, the combination with a bowl, of a central feed-tube projecting down into said bowl, and provided with a perforated conical base extending from the lower end of said feed-tube down into the corner of said bowl, and corrugated deflecting-disks arranged between said feed-tube and said bowl, but separated from each of them, substantially as described.

5. In a centrifugal liquid-separator, the combination with a bowl, a central feed-tube projecting down into said bowl, and provided with a perforated conical base, a conical deflecting-plate fastened to said bowl and located above said conical base, and a series of corrugated deflecting-disks arranged between said feed-tube and said bowl, but separated from both of them, substantially as described.

6. In a centrifugal liquid-separator, the combination with a bowl, of a central feed-tube provided with ribs projecting down into said bowl and terminating in a perforated conical base extending from the lower end of said feed-tube down into the corner of said bowl, and a series of corrugated deflecting-disks arranged around said feed-tube and engaged by said ribs, substantially as described.

7. In a centrifugal liquid-separator, the combination with a bowl, of a central feed-tube provided with vertical ribs extending down into said bowl and having a perforated conical base extending from the lower end of said feed-tube down into the corner of said bowl, a series of corrugated deflecting-disks arranged around said feed-tube, and means for separating said disks from each other, substantially as described.

8. In a centrifugal liquid-separator, the combination with a bowl, of a central feed-tube provided with vertical ribs projecting down into said bowl and having a perforated conical base extending from the lower end of said feed-tube down into the corner of said bowl, a conical deflecting-plate fastened to the interior of said bowl and located above the conical base of the feed-tube, a series of corrugated deflecting-disks arranged above said deflecting-plate and parallel therewith, said deflecting-disks being separated from said feed-tube and also from the interior of said bowl, and means for separating said disks from each other, substantially as described.

9. In a centrifugal liquid-separator, the combination with a bowl provided with outlets for cream and milk, a central feed-tube provided with vertical ribs extending down into said bowl and terminating in a perforated conical base which extends from the bottom of said feed-tube down into the corner of said bowl, a conical deflecting-plate fastened to the interior of said bowl located above and parallel to said base, but separated from said feed-tube by a space, a series of deflecting-disks provided with radial corrugations engaging said ribs and located parallel to said base between said feed-tube and said bowl, but separated from both of them, and means for separating said deflecting-disks from each other, substantially as described.

10. In a centrifugal liquid-separator, the combination with a bowl, of a central feed-tube projecting down into said bowl and provided with a perforated conical base extending from the lower end of said feed-tube down into the corner of said bowl, a series of downwardly-inclined deflecting-disks grouped around said central tube and provided with vertical openings near said tube, separators between said disks, said disks being provided with perforations located in the rear of said separators, a cap secured on said bowl and provided with an outlet for cream, and a plurality of pipes for the skim-milk leading from the upper and outer interior portion of said bowl, substantially as described.

In testimony whereof I affix my signature in presence of two witnesses.

THOMAS H. SPRINGER.

Witnesses:
CHAS. M. RAINSFORD,
M. T. MCMANUS.